United States Patent [19]

Bermanseder et al.

[11] 3,926,100

[45] Dec. 16, 1975

[54] BUS

[75] Inventors: Robert Bermanseder; Norbert Bermanseder, both of Sindelfingen, Germany

[73] Assignee: Daimler-Benz AG, Germany

[22] Filed: Jan. 2, 1974

[21] Appl. No.: 429,817

Related U.S. Application Data

[62] Division of Ser. No. 114,420, Feb. 11, 1971, Pat. No. 3,797,881.

[30] Foreign Application Priority Data

Feb. 12, 1970  Germany............................ 2006250

[52] U.S. Cl.............. 98/2.14; 98/2.15; 296/137 R
[51] Int. Cl.²...................... B62D 31/04; B60H 1/26
[58] Field of Search .......... 98/2, 2.11, 2.14, 8, 2.15, 98/4, 13, 2.06; 296/137 R

[56] References Cited
UNITED STATES PATENTS

| 1,935,456 | 11/1933 | McCarthy............................ 98/2.15 |
| 1,975,958 | 10/1934 | Kyle..................................... 98/2.15 |
| 2,165,559 | 7/1939 | Lintern................................ 98/2.15 |
| 2,171,622 | 9/1939 | Calkins................................ 98/2.15 |
| 2,269,451 | 1/1942 | Ford.................................. 296/31 P X |
| 2,389,907 | 11/1945 | Helmuth............................ 296/28 J |
| 3,560,041 | 2/1971 | Foster................................ 296/28 J |
| 3,675,566 | 7/1972 | McHugh et al....................... 98/8 |
| 3,777,648 | 12/1973 | McGowan et al. ................. 98/2.15 |
| 3,807,787 | 4/1974 | Gotz.................................. 98/2.14 |

FOREIGN PATENTS OR APPLICATIONS

| 231,836 | 6/1963 | Austria.............................. 296/28 R |
| 884,981 | 5/1943 | France.............................. 296/28 A |
| 333,734 | 1/1936 | Italy................................. 296/28 R |
| 241,243 | 8/1969 | U.S.S.R............................. 98/2.14 |

*Primary Examiner*—John J. Camby
*Assistant Examiner*—Henry C. Yuen
*Attorney, Agent, or Firm*—Craig & Antonelli

[57] ABSTRACT

A bus whose top structure includes a forward and rearward roll-over girder constructed as hollow bearers which are supported at the lower ends on the frame structure of the vehicle in order to increase the rigidity of the top, particularly against compression in case of rolling over during an accident.

13 Claims, 4 Drawing Figures

BUS

This is a division of application Ser. No. 114,420 filed Feb. 11, 1971, now U.S. Pat. No. 3,797,881.

The present invention relates to a bus whose top is so constructed that it possesses sufficient rigidity also in case of a lateral rolling-over of the vehicle over its roof caused by accidents in order to prevent thereby that the entire upper portion of the top is compressed up to approximately the lower edge of the windows.

Consequently, it is proposed in accordance with the present invention as solution to the underlying problems that roll-over girders constructed as hollow bearers be arranged approximately above the front axle and above the rear axle or within the area between rear axle and the rear end, which are supported at their lower ends on the frame structure of the vehicle.

The roll-over girders are thereby preferably connected by longitudinal bearers constructed as hollow bearers and are arranged as far outwardly within the roof area as possible.

In order to assure a particular rigidity of the top also in the forward area of the vehicle, these longitudinal bearers may be extended advantageously beyond the forward roll-over girder up to within the area above the windshield whereby the height thereof continuously decreases preferably from the forward roll-over girder up to the front end of the vehicle.

The longitudinal bearers may thereby serve as air guide means for the interior space-ventilation of the vehicle whereby the air inlet may take place by way of the roll-over girders.

Finally, a strong soiling of the rear end of the vehicle during the drive can be effectively counteracted in that upper and lateral air guide channels are constituted by the rear roll-over girder which produce an accelerated air stream in the direction toward the rear end of the vehicle.

The air discharge is to be constructed thereby in such a manner that the accelerated air is discharged essentially parallel to the rear window and rear wall of the vehicle.

Accordingly, it is an object of the present invention to provide a bus which avoids the aforementioned shortcomings and drawbacks encountered in the prior art.

Another object of the present invention resides in a bus with a top structure that is greatly improved from a safety point of view, particularly against rolling-over of the bus.

A further object of the present invention resides in a bus whose top is so constructed that it exhibits sufficient rigidity in order to prevent effectively any substantial compression of the top structure in case of a lateral rolling-over of the vehicle on its roof during an accident.

Still a further object of the present invention resides in a bus which not only excels by greatly improved rigidity of its top structure but which also greatly improves the ventilation and anti-soiling features particularly as regards the rear window and rear part of the vehicle.

These and further objects, features and advantages of the present invention will become more obvious from the following description when taken in connection with the accompanying drawing which shows, for purposes of illustration only, several embodiments in accordance with the present invention, and wherein.

Figure 1:
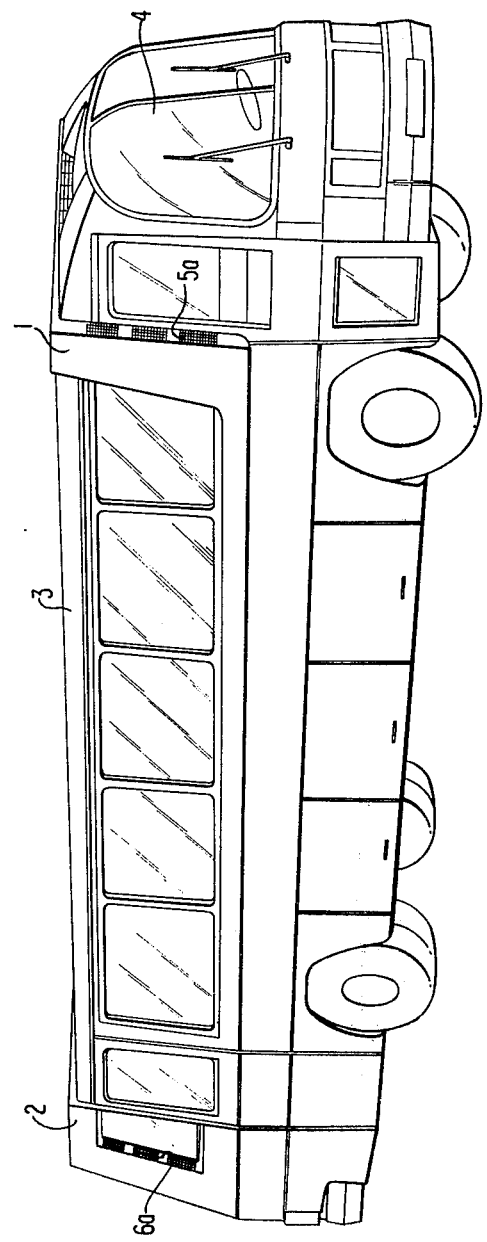
FIG. 1 is a perspective view of a bus constructed in accordance with the present invention as viewed from the side and in front thereof.
Figure 2:
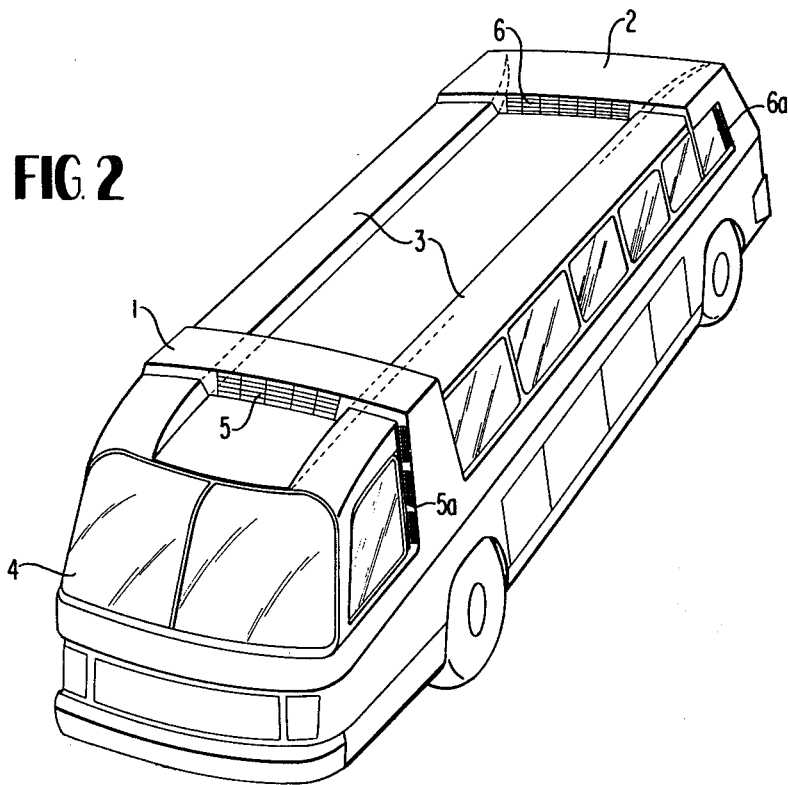
FIG. 2 is a perspective view of the bus of FIG. 1 as viewed from in front and from above.

Referring now to the drawing wherein like reference numerals are used throughout the various views to designate like parts, and more particularly to FIGS. 1 and 2, the bus illustrated in these figures includes a forward roll-over girder 1 and a rear roll-over girder 2 which are each constructed as hollow bearers. The two roll-over girders 1 and 2 are connected with each other by longitudinal bearers 3 constructed similarly as hollow bearers that are extended beyond the forward roll-over girder 1 and whose height decreases continuously within this area up to the windshield 4.

For purposes of achieving a favorable streamlining, the transition of windshield 4 to the central roof area and to the longitudinal bearers 3 should take place as steplessly as possible.

The roll-over girders or bearers 1 and 2 are laterally extended so far in the downward direction that they are supported on the frame structure of the vehicle of any conventional construction.

Both roll-over girders 1 and 2 are provided at the forward end faces with upper and lateral air inlet apertures 5, 6 and 5a, 6a (FIG. 2). The air entering thereby into the forward roll-over girder 1 can be conducted further into the longitudinal bearers 3 and may serve for the interior space ventilation whereas the air entering within the area of the rear roll-over girder 2 is discharged accelerated at the rear end of the bus and thus is able to prevent or at least strongly reduce the soiling thereof during the drive in case of unfavorable road conditions.

The air entering within the area of the lateral air inlet apertures 5a and 6a may also be accelerated and may again be discharged at the rear end faces of the lateral portions of the roll-over girders 1 and 2 in order to reduce the soiling of the side windows and of the rear end of the vehicle.

Figure 3:
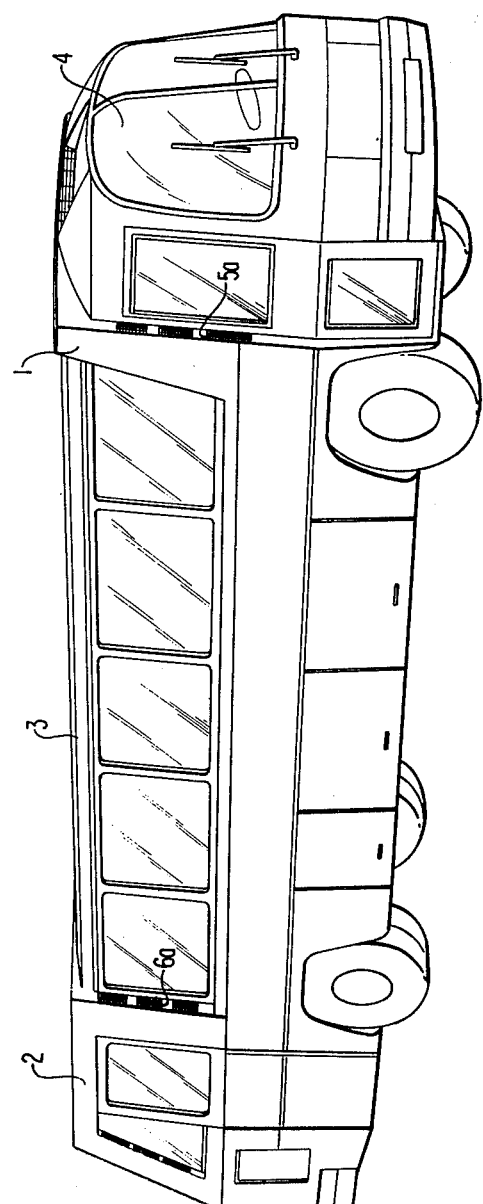
FIG. 3 is a perspective view, similar to FIG. 1, of a modified construction of a bus in accordance with the present invention with a different construction of the rear roll-over bearer.

The bus illustrated in FIG. 3 differs from the embodiment so far described hereinabove in that the rear roll-over girder is constructed considerably wider.

Figure 4:
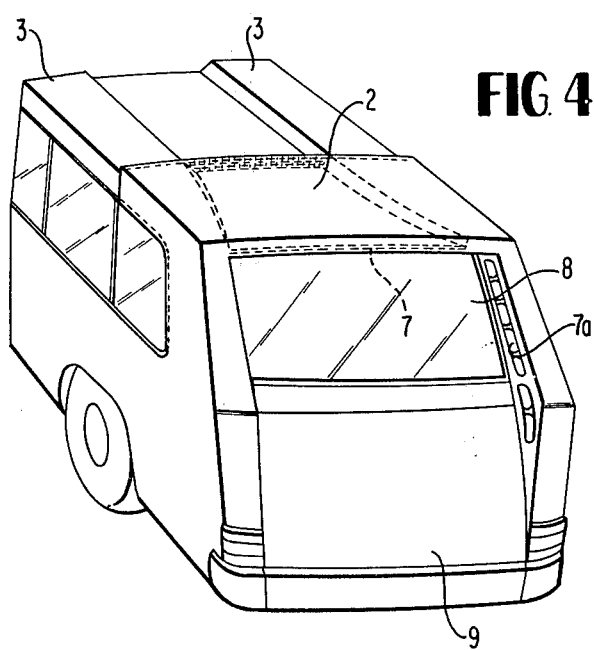
FIG. 4 is a partial perspective view as viewed from the rear of a bus in accordance with the present invention.

In particular, the arrangement and construction of the rear air discharge apertures 7 and 7a can be seen from FIG. 4, through which the air streams are conducted onto the rear window 8 and the rear wall 9 in order to reduce at least far-reachingly the soiling thereof during the drive with unfavorable road conditions.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and

What we claim is:

1. A bus body arrangement comprising:
lower frame means operatively connected to respective front and rear axles,
a forward roll-over girder means constructed as a hollow bearer means extending upwardly from said lower frame means,
a rearward roll-over girder means constructed as a hollow bearer means extending upwardly from said lower frame means,
each of said roll-over girder means being supported on said lower frame means,
a first longitudinal bearer means constructed as a hollow bearer means extending longitudinally along one lateral side of a roof area of the bus body, and
a second longitudinal bearer means constructed as a hollow bearer means extending along the lateral side of said roof area opposite said one lateral side,
each of said first and second longitudinal bearer means being connected with said forward and rearward roll-over girder means, wherein the longitudinal bearer means include means for the guideance of air for the interior ventilation of the bus body.

2. A bus body arrangement according to claim 1, wherein the roll-over girder means are provided with apertures for admitting air for the interior ventilation of the busy body.

3. A bus body arrangement according to claim 2, wherein air guide channel means are formed by the rear roll-over girder means at the top and sides thereof which produce an accelerated air flow in the direction toward the rear end of the vehicle during the drive thereof.

4. A bus body arrangement according to claim 3, wherein air guide channel means are formed by the lateral parts of the forward roll-over girder means which produce an accelerated air flow in the direction of side windows disposed behind the forward roll-over girder means during the drive of the vehicle.

5. A bus body arrangement according to claim 1, wherein air guide channel means are formed by the rear roll-over girder means at the top and sides thereof which produce an accelerated air flow in the direction toward the rear end of the vehicle during the drive of the vehicle.

6. A bus body arrangement according to claim 1, wherein air guide channel means are formed by the lateral parts of the forward roll-over girder means which produce an accelerated air flow in the direction of side windows disposed behind the forward roll-over girder means during drive of the vehicle.

7. A bus body arrangement according to claim 6, wherein said roll-over girder means protrude laterally outwardly of the immediately adjacent outer body parts.

8. A bus body arrangement according to claim 1, wherein said roll-over girder means protrude upwardly of the immediately adjacent roof portions of the bus body.

9. A bus body arrangement according to claim 1, wherein said longitudinal bearer means protrude upwardly of the immediately adjacent roof portions of the bus body.

10. A bus body arrangement according to claim 1, wherein said rearward roll-over girder means extends rearwardly to a position immediately adjacent to the rearmost part of the bus body.

11. A bus body arrangement according to claim 1, wherein said longitudinal bearer means form the respective uppermost and laterally outermost parts of the bus body along a substantial portion of their length.

12. A bus body arrangement according to claim 1, wherein each of said roll-over girder means extend in a U-shaped manner with one leg of the U attached to said lower frame means at one lateral side of the bus body and the other leg of the U attached to said lower frame means at the other side of the bus body, the bridge of the U extending over a passenger space of the bus body.

13. A bus body arrangement according to claim 1, wherein said first and second longitudinal bearer means extend forwardly beyond said forward roll-over girder means up to a position adjacent a forward windshield mounting means.

* * * * *